Figure 1:
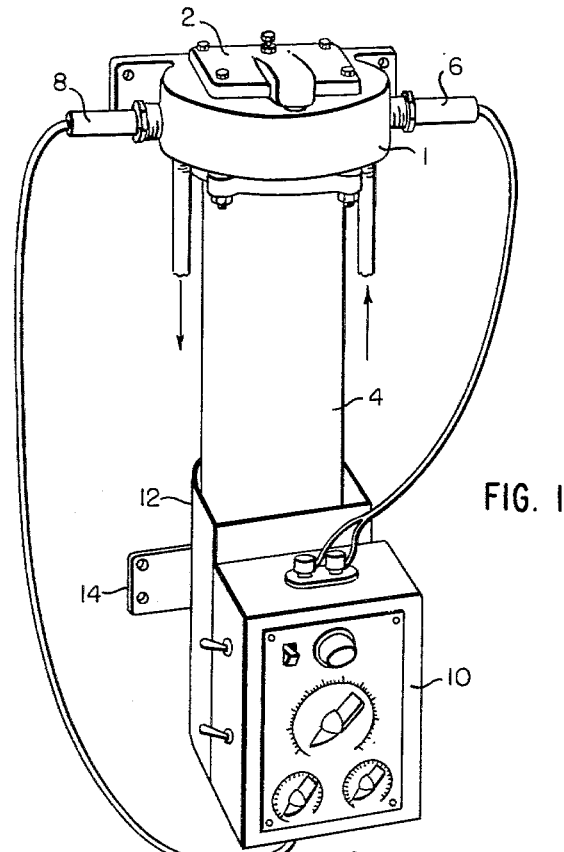

May 24, 1966

V. C. SMITH ETAL 3,252,578

COMBINED DEMINERALIZATION AND FILTRATION UNIT

Filed Nov. 29, 1963

2 Sheets-Sheet 1

INVENTORS
VERITY C. SMITH
ROYAL C. TAFT
BY
ATTORNEYS

May 24, 1966 V. C. SMITH ETAL 3,252,578
COMBINED DEMINERALIZATION AND FILTRATION UNIT
Filed Nov. 29, 1963 2 Sheets-Sheet 2
FIG. 3
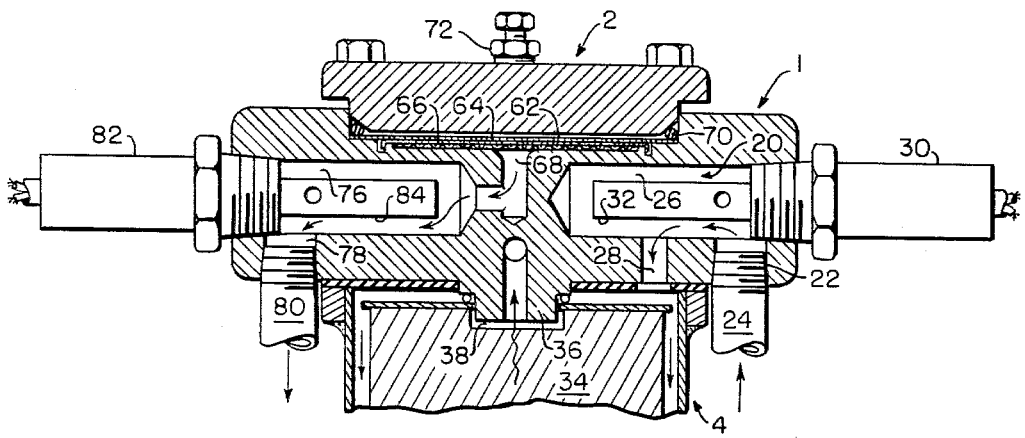
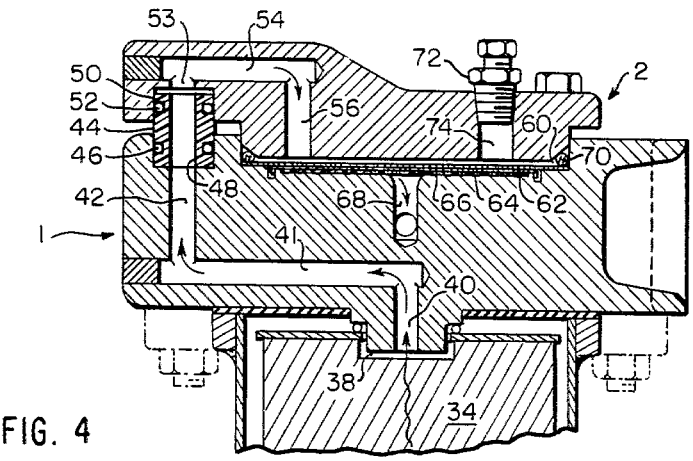
FIG. 4
INVENTORS
VERITY C. SMITH
ROYAL C. TAFT
BY
ATTORNEYS

United States Patent Office 3,252,578
Patented May 24, 1966

3,252,578
COMBINED DEMINERALIZATION AND FILTRATION UNIT
Verity C. Smith, 5 Westfield St., Dedham, Mass., and Royal C. Taft, 331 Main St., Hingham, Mass.
Filed Nov. 29, 1963, Ser. No. 326,835
8 Claims. (Cl. 210—266)

The invention relates to a repurification system for filtering and purifying a liquid.

Repurifying systems are used, for example, to repurify the recycled water used to cool vacuum power tubes. The useful life of power tubes is drastically shortened by dissolved impurities and suspended particles in the cooling water which deposit on the tube surface, insulating it and inducing overheating. They also may render the water conductive and short the tube. The water repurification system purifies the cooling water by removing dissolved gases such as oxygen and carbon dioxide, dissolved minerals such as copper, and by filtering suspended or colloidal particles such as metal oxides.

Present systems of this type commonly include, besides appropriate liquid flow control valves and liquid pressure gauges, appropriate supports and canisters for the demineralizing cartridge and filter film as well as liquid purity sensors in the incoming and discharged water stream for sensing and indicating the amount of purification achieved by the system. A separate housing for each valve, purity sensor, demineralization cartridge, filter film and pressure gauge is provided, and these members are interconnected by appropriate plumbing. This results in a patchwork of plumbing and housings, which is expensive due to the multiplicity of housings and pipes required, each housing and pipe in turn requiring separate machining operations to form and finish it. Also, because of this patchwork of plumbing and housings, the system, which is in reality rather simple to operate, appears to be unduly complex to decipher and operate.

The primary object of the present invention is to substantially reduce the expense of the final system and to provide a compact unit which in appearance confirms the simplicity of operation of the system, and which also provides ready access to the members housed by the unit. This and other objects will be apparent from the following description of a preferred embodiment of the invention.

The present invention attains these objects by replacing the various housings and interconnecting pipes required by present repurification systems with a single compact housing—a combined demineralization and filtration unit, rather than separate interconnected units.

The combined demineralization and filtration unit includes, among its more important features, a unitary head, at least one canister sealed to the bottom surface of the head and housing a water-treatment cartridge arranged for fluid flow between an outer inlet to the cartridge and a central discharge channel of the cartridge, the head including a cavity in its top surface, a filter received in the cavity, and a cap over the cavity and sealed to the head to close the cavity. The head includes various channels; an inlet bore which extends through the head between an exposed outer surface of the head and the outer inlet channel of the canister, a passageway which extends through the head between the central discharge channel of the canister and one side of the filter, and an outlet bore which extends through the head between the other side of the filter and an exposed surface of the head. These channels direct water supplied to the inlet bore through the head, the canister, and the filter to the outlet bore. Preferably the inlet and outlet bores include enlarged portions communicating with the exterior of the head, which portions receive conductivity cells for sensing the purity of the water passing through the head. Thus, a single compact head houses and supports the main elements of the repurification system.

Figure 2:
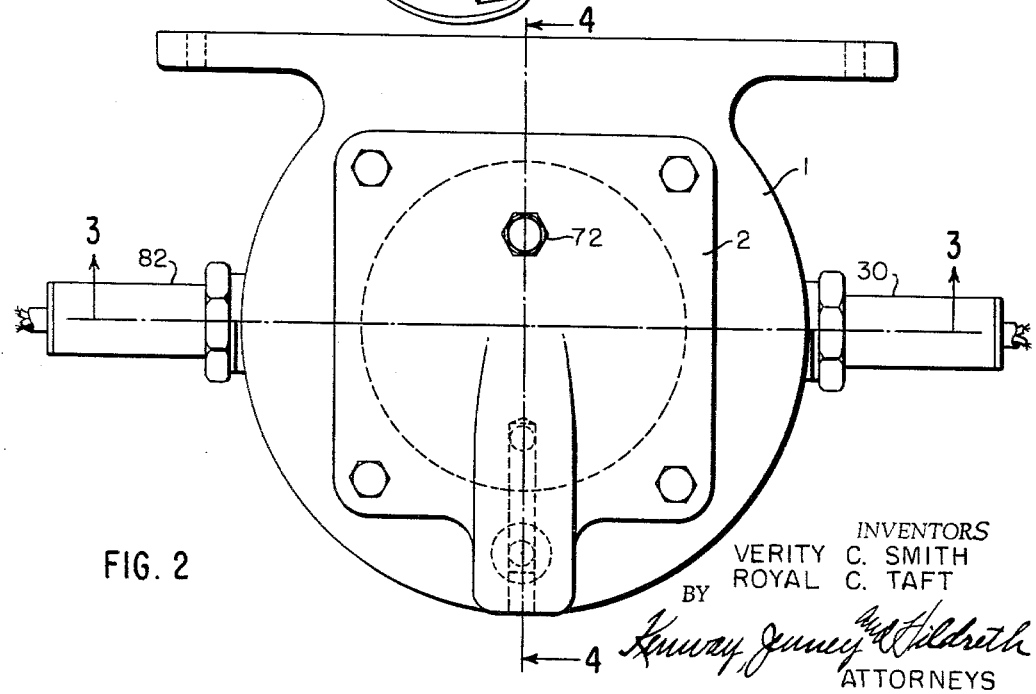

The invention will be further described in connection with the accompanying drawings, in which:

FIG. 1 is a view in perspective of the assembled combined demineralization and filtration unit, FIG. 2 is a top view of the head and associated elements of the combined demineralization and filtration unit, FIG. 3 is a sectional view of the head taken on lines 3—3 of FIG. 2, and FIG. 4 is a sectional view of the head taken on lines 4—4 of FIG. 2.

In a preferred embodiment of the invention, the combined demineralization and filtration unit includes a head 1 attached to a vertical supporting surface, and to which is bolted a cap 2 and a canister 4, the canister housing the water treatment cartridge. Appropriate demineralizing cartridges and filters are sold by the Barnstead Still and Sterilizer Co. of Boston, Massachusetts. Conductivity cells 6 and 8, threaded into the head, are electrically connected to a purity meter 10 which is supported by a cylindrical meter bracket 12 extending about canister 4. Appropriate seals between the members seal them together to form a water-tight unit. The meter bracket 12 is pivotally attached to a supporting bar 14, which in turn is attached to the supporting surface. When the canister 4 is unbolted from the head, it slips down through the meter bracket, the head of the canister engaging the upper rim of the meter bracket to prevent the canister from falling to the floor and to hold the canister at a convenient working level. The meter bracket may be pivoted relative to bar 14 to permit the cartridge to be slipped from the canister. The internal structure of the head, cap and canister is shown in FIGURES 3 and 4.

An inlet bore 20 extends through the head from an exposed outer surface adjacent the canister to the interior of the canister. The inlet bore is formed of three separately drilled channels: a vertical outer channel 22 threaded to receive an inlet pipe 24 through which water to be treated flows, a horizontally extending enlarged channel 26 communicating with the outer channel 22, and an inner vertical channel 28 extending between the enlarged horizontal channel 26 and the interior of the canister. The casing 30 of the conductivity cell 6 is threaded into the horizontal channel 26 to close it and permit water to flow from the inlet pipe 24 only to the inner channel 28. The sensing head 32 of the conductivity cell extends in the flow of inlet water axially along the channel 26, and senses the purity of the inlet water flowing past it.

A demineralizing cartridge 34 is received in the canister 4, the top surface of the cartridge bearing against a central downwardly extending boss 36 projecting from the head 1, the cartridge being sealed about this boss by a gasket. Water flowing from the inlet channel 28 into the canister 4 flows down along outside of the demineralizing cartridge and then up through the body of the cartridge to a central outlet channel 38, the material in the cartridge demineralizing the water.

As shown in FIGURE 4, the demineralized water in outlet channel 38 flows upwardly through a vertical channel 40 in the head, then laterally through a horizontal channel 41, then again upwardly through a vertical channel 42. The upper portion of channel 42 is enlarged and receives a coupling 44, the coupling 44 being sealed to the channel 42 by an O-ring 46 carried by the coupling. The coupling includes a vertically extending channel 48 in line with channel 42. The upper portion of coupling 44 is received in an opening 50 in the cap 2, the upper portion of the coupling being sealed to the opening in the cap by an O-ring 52. Preferably O-rings 46 and 52 bear against vertical walls of the head and cap, as illustrated, so that any thermal expansion of the head and cap away from one another will not reduce or destroy the sealing engagement of the coupling with the head and cap, the seals sliding along the adjacent vertical walls. As an alternative construction, the coupling may be formed as an integral part of either the head or the cap.

Opening 50 in the cap communicates with a short vertical channel 53 which terminates at a horizontal, inwardly extending channel 54 in the cap. An inner vertical channel 56 extends between the inner end of channel 54 and the lower surface of the cap. Channels 40, 41, 42, 48, 53, 54 and 56 together comprise a passageway extending through the head and cap for directing demineralized water in the central outlet channel 38 of the cartridge through the head and cap to the lower surface of the cap.

The upper surface of the head includes a cavity 60 which snugly receives the lower portion of the cap. A filter 62 is received in the cavity under the lower surface of the cap, and rests upon a perforated plate 64 which in turn rests upon a screen 66, the perforated plate and screen permitting ready flow of liquid filtrate from the filter to a discharge channel 68 under the screen 66. An O-ring 70 is compressed in the cavity between the lower surface of the cap, the upper margin of the filter, and the adjacent side wall of the cavity to seal these members to one another when the cap is bolted to the head. The cap is shaped to provide a slight space between its lower surface and the upper surface of the filter to permit liquid to flood the entire upper surface of the filter and pass through the filter to the centrally located discharge channels 68. A one-way vent valve 72 is threaded into a vertical channel 74 in the cap, the vent valve venting any gases collecting in the cavity to the atmosphere so as to prevent contamination of the liquid being demineralized and filtered by collected gases in the unit. Other vent valves may be provided in the head and cap, if desired, such as over the conductivity cell channels, to insure that no gases collect in the unit.

As shown in FIGURE 3, the central discharge channel 68 communicates with a horizontal channel 76, the outer portion of which is enlarged, which horizontal channel in turn communicates with an outer vertical channel 78. A discharge pipe 80 is threaded into channel 78 to receive the demineralized and filtered liquid flowing from the head. The casing 82 of the conductivity cell 8 is threaded into channel 76, to seal the channel and permit liquid to flow only into channel 78. The sensing head 84 of the conductivity cell extends in the flow of discharge liquid axially along channel 76 to sense the purity of the filtered and demineralized liquid flowing through this channel.

It is to be understood that, if desired, appropriate liquid control valves and pressure sensors may be provided in inlet pipe 24 and outlet pipe 80.

Thus the combined demineralization and filtration unit combines the various housings and interconnecting plumbing for the canister, filter, and conductivity cells into a single compact unit, thereby reducing the cost of the unit and resulting in a compact unit which in appearance confirms its simplicity of operation. Furthermore, because of the unique design of the unit, all components housed by the unit are readily accessible, including the filter, conductivity cells, and demineralizing cartridge, and the filter and demineralizing cartridge may be changed independently of one another.

In addition, because of the design of the head and cap of the demineralizing and filtration unit, all channels are easily formed by drilling from the exterior of the head or cap directly into the cap or head, and only two of the channels, namely channels 41 and 54, need be plugged.

While a preferred embodiment of the combined demineralization and filtration unit has been described, it is to be understood that various modifications may be made in the details of its construction without departing from the scope or spirit of this invention.

We claim:
1. A combined demineralization and filtration unit comprising a unitary head having an outer inlet channel and a central outlet channel, at least one canister sealed to the bottom surface of the head and housing a water treatment cartridge arranged for liquid flow between said outer inlet channel and said central outlet channel, an inlet bore extending through the head between an exposed outer surface of the head and said outer inlet channel, the head including a cavity in its top surface, a filter received in the cavity and arranged therein for filtration, a cap over the cavity and sealed to the head to close the cavity, a passageway extending through the head between the central outlet channel and one side of the filter, an outlet bore extending through the head between the other side of the filter and an exposed outer surface of the head whereby liquid supplied to the inlet bore will be directed through the head, the canister, and the filter to the outlet bore.

2. A combined demineralization and filtration unit as set forth in claim 1 in which at least a portion of the inlet and outlet bores are enlarged, and including conductivity cells sealed to the head and extending into the enlarged portions of the inlet and outlet bores.

3. A combined demineralization and filtration unit as set forth in claim 1 in which said cap includes a portion of said passageway extending through the head between the central outlet channel and one side of the filter.

4. A combined demineralization and filtration unit as set forth in claim 3 including a cylindrical coupling extending between the head and cap and connecting the portions of said passageway in the head and cap, and means including at least one sealing ring sealing the coupling to the head and cap.

5. A combined demineralization and filtration unit as set forth in claim 3 including a sealing ring between the cap and the filter bearing against the filter and sealing the filter to the walls of the head and cap, and including a vent valve communicating with a liquid directing surface of the unit to vent gases collecting in said combined demineralization and filtration unit.

6. A combined demineralization and filtration unit as set forth in claim 5 including a cylindrical coupling connecting the portion of said passageway on said head with the portion of said passageway in the cap, and means including at least one sealing ring sealing the coupling to the head and cap.

7. A combined demineralization and filtration unit as set forth in claim 6 in which said sealing means comprises a sealing ring between a side wall of the coupling and the adjacent side wall of the head, and a sealing ring between the side wall of the coupling and the adjacent side wall of the cap, the sealing rings being compressed between the coupling and the adjacent side walls of the head and cap to seal the head to the cap while permitting expansion of the head and cap relative to one another.

8. A combined demineralization and filtration unit comprising a unitary head having an outer inlet channel and a central outlet channel, at least one canister sealed to the bottom surface of the head and housing a water treatment cartridge arranged for liquid flow between said outer inlet channel and said central outlet channel, an inlet bore extending through the head between an exposed outer surface of the head and said outer inlet channel, a portion of the inlet bore being enlarged, a first conductivity cell threadably supported by and sealed to the head and extending into the enlarged portion of the inlet bore, the head including a cavity in its top surface, a filter received in the cavity, a cap over the cavity and secured to the head, a sealing ring between the cap and the filter sealing the cap, filter, and head to one another, a passageway extending through the head and cap between the central outlet channel and one side of the filter, the passageway including axially aligned end portions in the head and cap, a cylindrical coupling extending between the head and cap and connecting the end portions of the passageway in the head and cap, means including at least one sealing ring sealing the coupling to the head and cap, an outlet bore extending through the head between the other side of the filter and an exposed outer surface of the head, a portion of the outlet bore being enlarged, and a second conductivity cell threadably supported by and sealed to the head and extending into the enlarged portion of the outlet bore, whereby liquid supplied to the inlet bore will be directed through the head, the canister, and the filter to the outlet bore, during which flow its incoming purity will be sensed, it will be demineralized and filtered, and its outgoing purity will be sensed.

References Cited by the Examiner

UNITED STATES PATENTS

| | | | |
|---|---|---|---|
| 2,617,766 | 11/1952 | Emmett et al. | 210—96 X |
| 2,987,187 | 6/1961 | Comroe | 210—282 X |
| 2,997,178 | 8/1961 | Lorimer | 210—287 X |

REUBEN FRIEDMAN, *Primary Examiner.*

D. M. RIESS, *Assistant Examiner.*